US012573139B2

(12) United States Patent
Jaggi

(10) Patent No.: US 12,573,139 B2
(45) Date of Patent: Mar. 10, 2026

(54) ORDERING DATA RECEIVED FROM AN AUGMENTED REALITY SERVICE TO PROVIDE A VIRTUAL REALITY EXPERIENCE

(71) Applicant: VRChat Inc., San Francisco, CA (US)

(72) Inventor: Chelsea Jaggi, San Francisco, CA (US)

(73) Assignee: VRCHAT INC., San Francisco, CA (US)

( * ) Notice: Subject to any disclaimer, the term of this patent is extended or adjusted under 35 U.S.C. 154(b) by 224 days.

(21) Appl. No.: 18/436,100

(22) Filed: Feb. 8, 2024

(65) Prior Publication Data

US 2025/0259379 A1 Aug. 14, 2025

(51) Int. Cl.
*G06T 17/00* (2006.01)
*G06F 3/01* (2006.01)
*G06T 7/20* (2017.01)
*H04N 13/344* (2018.01)

(52) U.S. Cl.
CPC ............. *G06T 17/00* (2013.01); *G06F 3/012* (2013.01); *G06F 3/017* (2013.01); *G06T 7/20* (2013.01); *H04N 13/344* (2018.05)

(58) Field of Classification Search
CPC ........ G06F 3/011; G06F 3/0346; G06F 3/012; G06F 3/017; G06T 17/00; G06T 7/20; H04N 13/344
See application file for complete search history.

(56) References Cited

U.S. PATENT DOCUMENTS

| | | | |
|---|---|---|---|
| 12,086,919 B2 * | 9/2024 | Zhang | G06F 3/013 |
| 2017/0155885 A1 * | 6/2017 | Selstad | G06T 7/20 |
| 2023/0053205 A1 * | 2/2023 | Nepveu | H04N 21/44218 |
| 2024/0259529 A1 * | 8/2024 | Sarkis | G06F 3/011 |

* cited by examiner

*Primary Examiner* — Xilin Guo
(74) *Attorney, Agent, or Firm* — Polsinelli PC

(57) ABSTRACT

The present technology combines low latency sensor data from gyroscopes and accelerometers with accurate but higher latency data from AR frames by reordering a received series of data collected from the gyroscopes, accelerometers, and AR frames so that the AR frame is placed in the series of data earlier in time than it was received—to a time that corresponds with gyroscope and accelerometer data corresponding to a position and time which the AR frame capture was initiated. The correctly ordered data can then be used to project where the user will be looking at a future time so that the virtual reality application can render a scene that corresponds with the user's expectations. In this way, a smartphone can be used to provide a good virtual reality experience when used with a simple viewer, thus making virtual reality experiences more accessible.

20 Claims, 6 Drawing Sheets

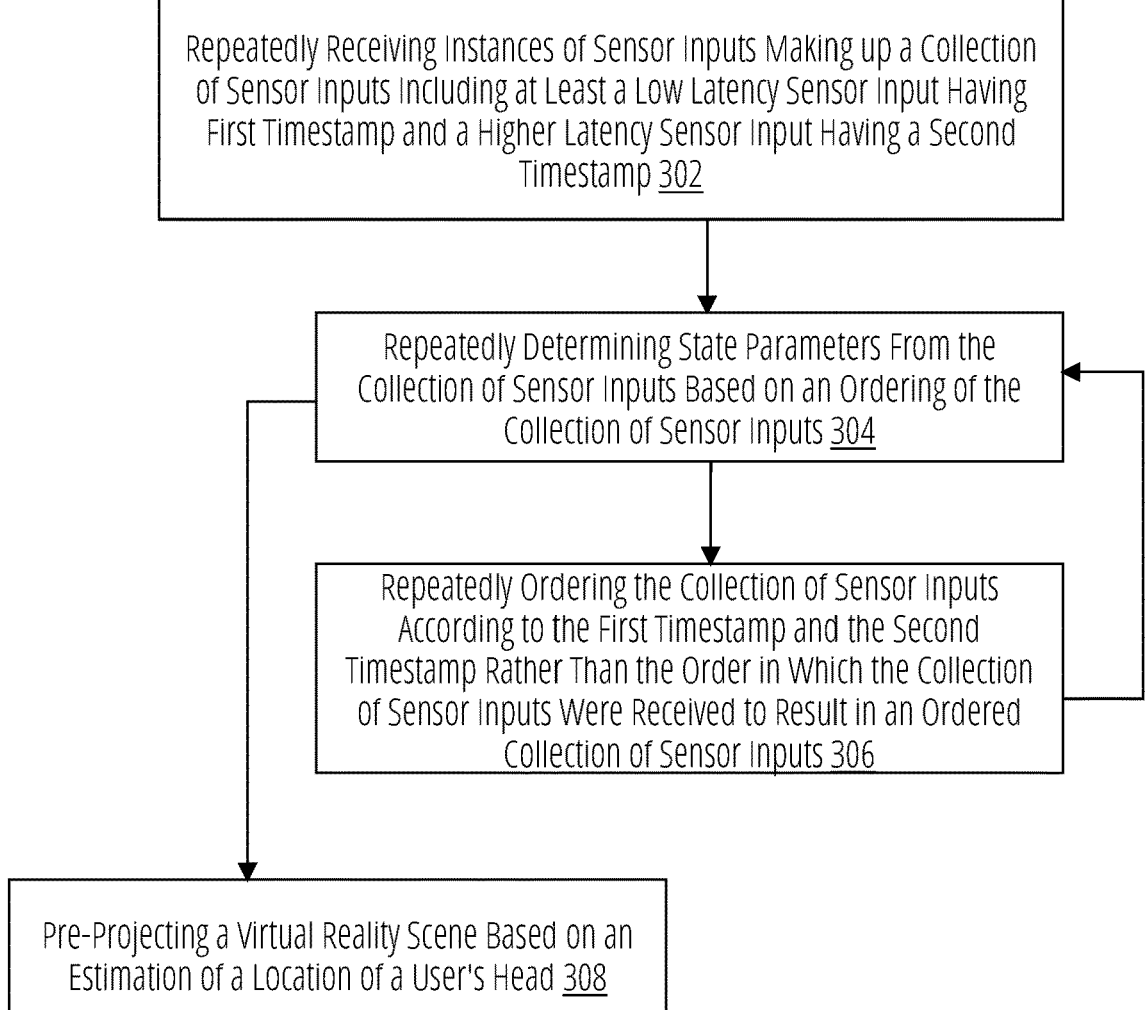

Repeatedly Receiving Instances of Sensor Inputs Making up a Collection of Sensor Inputs Including at Least a Low Latency Sensor Input Having First Timestamp and a Higher Latency Sensor Input Having a Second Timestamp 302

Repeatedly Determining State Parameters From the Collection of Sensor Inputs Based on an Ordering of the Collection of Sensor Inputs 304

Repeatedly Ordering the Collection of Sensor Inputs According to the First Timestamp and the Second Timestamp Rather Than the Order in Which the Collection of Sensor Inputs Were Received to Result in an Ordered Collection of Sensor Inputs 306

Pre-Projecting a Virtual Reality Scene Based on an Estimation of a Location of a User's Head 308

FIG. 3

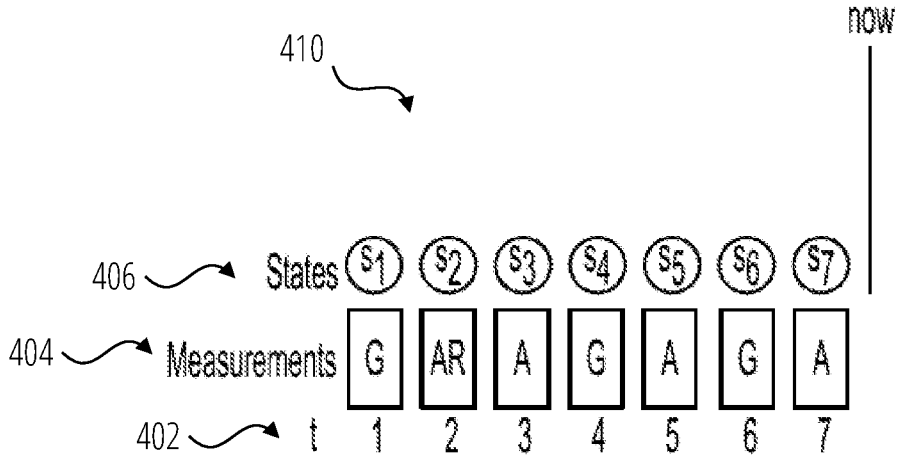
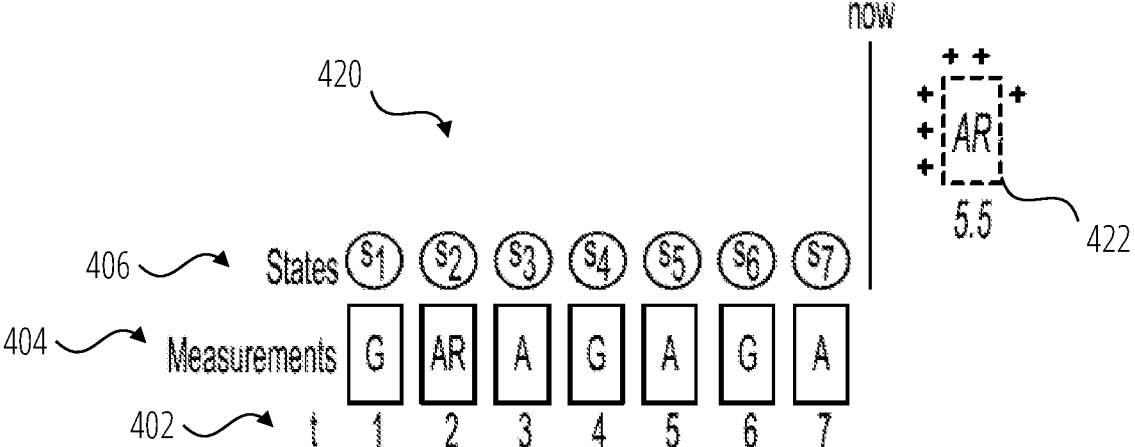
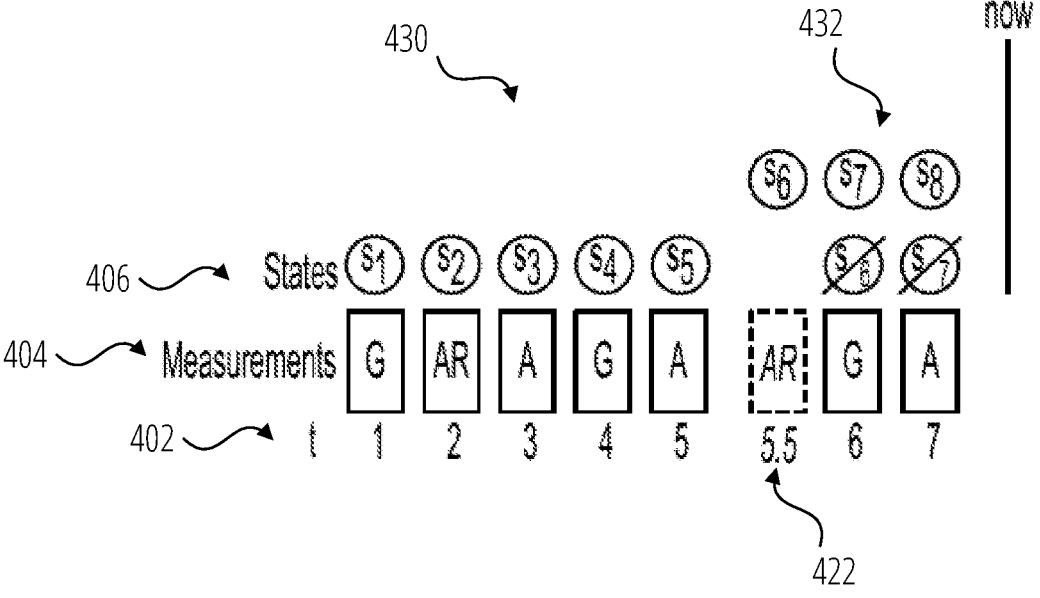
FIG. 4

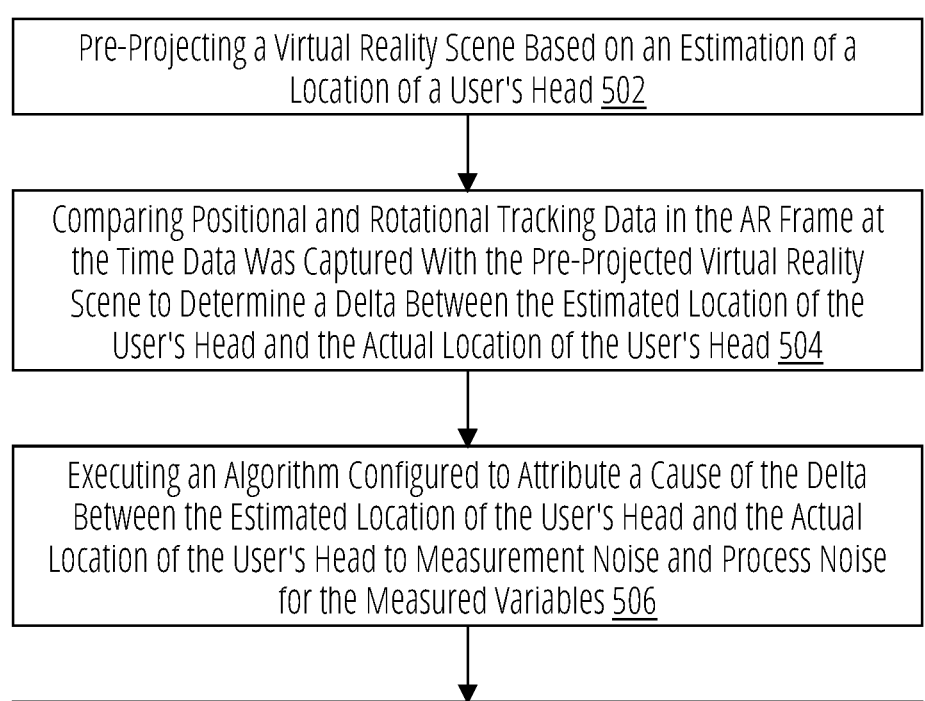

Pre-Projecting a Virtual Reality Scene Based on an Estimation of a Location of a User's Head 502

Comparing Positional and Rotational Tracking Data in the AR Frame at the Time Data Was Captured With the Pre-Projected Virtual Reality Scene to Determine a Delta Between the Estimated Location of the User's Head and the Actual Location of the User's Head 504

Executing an Algorithm Configured to Attribute a Cause of the Delta Between the Estimated Location of the User's Head and the Actual Location of the User's Head to Measurement Noise and Process Noise for the Measured Variables 506

Tuning Error Bounds to Account for the Measurement Noise for the Measured Variables to Result in More Accurate Pre-Projection 508

FIG. 5

ORDERING DATA RECEIVED FROM AN AUGMENTED REALITY SERVICE TO PROVIDE A VIRTUAL REALITY EXPERIENCE

BACKGROUND

One barrier to accessing virtual reality experiences is the need for specialized hardware such as a virtual reality headset, which can sometimes be a luxury not accessible to many. Some application developers have attempted to work around this requirement by developing virtual reality applications that are executed on a portable device, such as a smartphone. Such virtual reality applications can divide a display of a portable device into two display areas, one for the right eye and another for the left eye. Then, to give the user the virtual reality experience, the portable device can be inserted into a viewer, which can be as simple as a cardboard housing that can hold the portable device in front of lenses through which the user can view a virtual world in virtual reality.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 3 illustrates an example routine for ordering data received from sensors and augmented reality (AR) frames to provide a virtual reality experience in accordance with some aspects of the present technology.

FIG. 4 illustrates examples of timelines of a collection of sensor inputs in accordance with some aspects of the present technology.

FIG. 5 illustrates an example routine for tuning the present technology with more accurate estimations of measurement noise and process noise in accordance with some aspects of the present technology.

DETAILED DESCRIPTION

Figure 1:
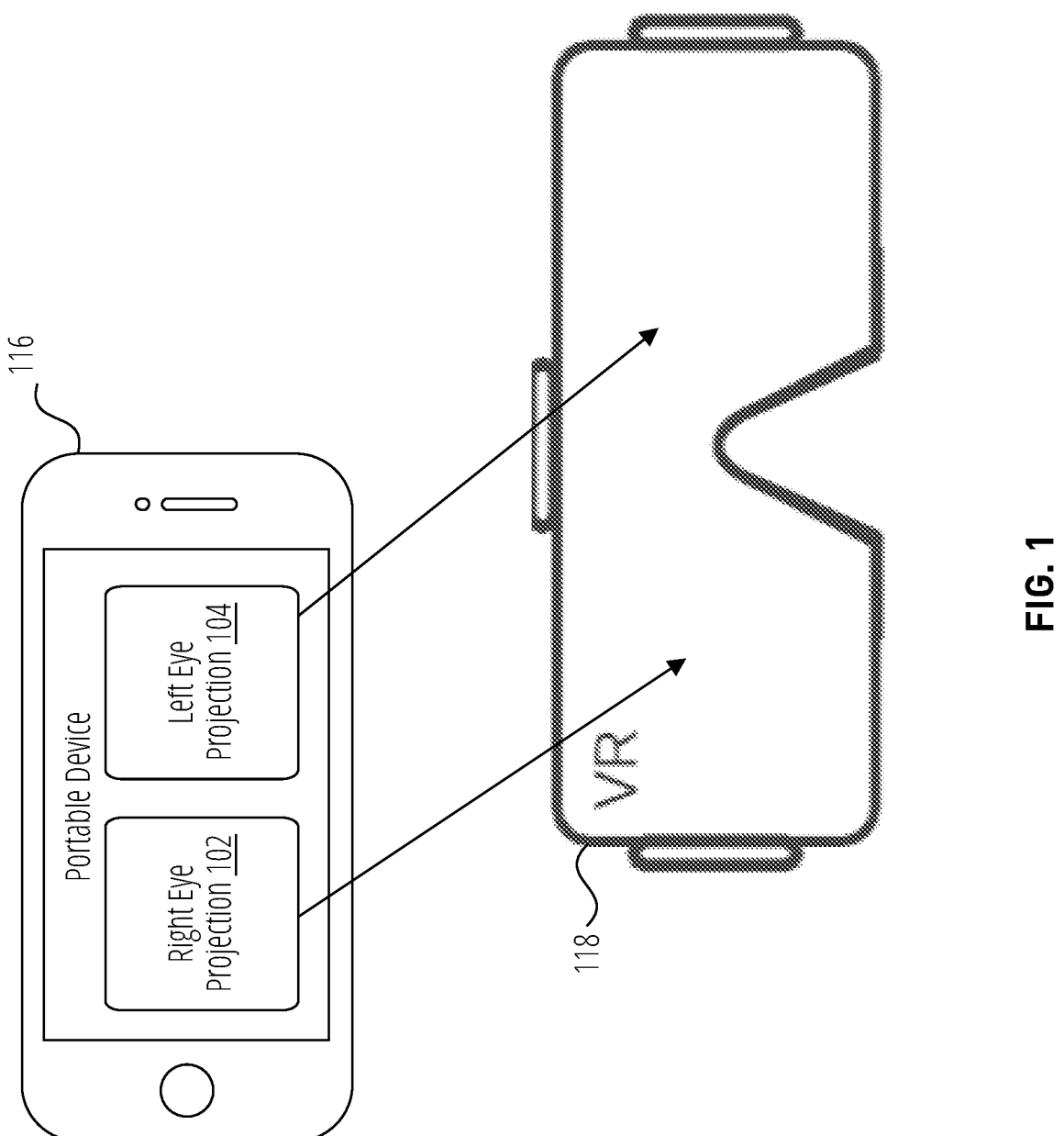
FIG. 1 illustrates the use of a portable device rendering a virtual reality application in accordance with some aspects of the present technology.

One barrier to accessing virtual reality experiences is the need for specialized hardware such as a virtual reality headset, which can sometimes be a luxury not accessible to many. Some application developers have attempted to work around this requirement by developing virtual reality applications that are executed on a portable device, such as a smartphone. Such virtual reality applications can divide a display of a portable device into two display areas, one for the right eye and another for the left eye. Then, to give the user the virtual reality experience, the portable device can be inserted into a viewer, which can be as simple as a cardboard housing that can hold the portable device in front of lenses through which the user can view a virtual world in virtual reality.

One aspect of portable devices that can enable them to be used to render virtual reality display areas as described above is that portable devices include sensors such as a gyroscope and an accelerometer that can be used to make some determinations about the portable device's movements in space. These sensors can provide inputs into a virtual reality application to enable it to approximate the movement of a user's head or body in order to render views that coordinate the user's physical movements with a changing view and point of view in virtual reality. However, sensors such as gyroscopes and accelerometers can provide noisy data, which can impair the quality of the virtual reality experience.

Some portable devices also have augmented reality (AR) capabilities. In fact, some operating systems such as iOS by APPLE, INC. and ANDROID by ALPHABET, INC. include AR features into the operating systems that can fuse inputs from the camera(s) and other sensors to provide AR frames. AR frames are camera outputs enhanced with relatively accurate position, orientation, and rotational metadata, among other attributes.

These AR frames could be useful for providing higher quality virtual reality applications and experiences because they provide more accurate position, orientation, and rotational, but the extra processing required to create such frames introduces latency to the output of the AR frames from an AR tracking service.

AR frames often come through with 100 milliseconds or more of latency because the phone takes the picture from the camera, and then the phone performs a processing routine to figure out exactly where the phone is located in space at the time the picture was captured by doing post-processing. If you're in an AR application, the latency doesn't matter because the latency isn't significantly greater than the latency that the camera generally exhibits, but in a virtual reality experience this extra latency can cause the user to experience nausea. The cause of the nausea is that the user's body is perceiving movement, both from learned experience that triggering a group of muscles should trigger the head to turn at an expected speed and from a balance that originates from the inner ear that does not match what is visually perceived by the user. The latency in AR frames can cause latency in the virtual reality experience or an inaccurate virtual reality experience that does not match the user's expectation, which triggers nausea.

The present technology solves this problem by combining the low latency sensor data from gyroscopes and accelerometers, with the accurate data from AR frames by reordering a received series of data collected from the gyroscopes, accelerometers, and AR frames so that the AR frame is placed in the series of data earlier in time than it was received—to a time that corresponds with gyroscope and accelerometer data corresponding to a position and time which the AR frame capture was initiated.

The correctly ordered data can then be used to project where the user will be looking at a future time so that the virtual reality application can render a scene that corresponds with the user's expectations. In this way, a smartphone can be used to provide a good virtual reality experience when used with a simple viewer, thus making virtual reality experiences more accessible.

The present technology presents an unexpected solution to the problem because when problems with sensor latency exist in the industry, the expected solution is to develop a sensor with less latency. The state of the virtual reality industry is such that improved hardware is generally seen as a key focus to provide better virtual reality experiences.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates the use of a portable device rendering a virtual reality application in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

FIG. 1 illustrates an example portable device 116 rendering a virtual reality application by rendering the application into a right eye projection 102 and a left eye projection 104. The right eye projection 102 is a view of a frame(s) from the virtual reality application created for a right eye, while the left eye projection 104 is a view of the frame(s) from the virtual reality application created for a left eye. The right eye projection 102 and left eye projection 104 generally present the same frame except that the angle from which the scene in the frame is viewed is offset slightly to reproduce a viewing angle from the right eye and left eye, respectively.

In order to convert the right eye projection 102 and left eye projection 104 into a virtual reality experience, the right eye projection 102 needs to be viewed exclusively from the user's right eye, and the left eye projection 104 needs to be viewed exclusively from the user's left eye. This is facilitated by a virtual reality viewer 118. In some embodiments, the virtual reality viewer 118 can be a simple and cheap device that includes a housing that can hold the portable device 116 in front of the user's eyes, and generally a right lens and left lens, where the lenses are positioned between the display of the portable device 116 and the user's eyes. An example of such a viewer is GOOGLE'S CARDBOARD, which is an inexpensive cardboard housing with lenses and a pocket to hold the 116 in front of the lenses.

Inexpensive virtual reality viewers 118 can make virtual reality experiences more accessible, but since they rely on sensors and functionality of the portable device 116, which is not a dedicated virtual reality device, the problems with poor rendering that can result in nausea, as addressed below, can occur. The present technology overcomes such problems when using the portable device 116 and virtual reality viewer 118 in this configuration.

Since these inexpensive virtual reality viewers 118 typically do not come with any other hardware, such as controllers, the virtual reality application can execute a hand-tracking process that is configured to receive camera images from the portable device to track positions and gestures of the user's hands and translate those positions and gestures into inputs into the virtual relation application. The virtual reality application can estimate hand position based on a rigid body simulation and then estimate finger position using unscented Kalman filtering, which turns finger angles into muscle usage and back again. In this way, the virtual reality application can compensate for the lack of specialized hardware controllers by utilizing hardware and software that can execute on the portable device.

Similarly, these inexpensive virtual reality viewers 118 and the portable device are not specialized virtual reality headsets, they might suffer from an occasional lack of processing resources. For example, when the portable device is a smartphone, the smartphone has a variety of other tasks to perform that are not related to smoothly rendering the virtual reality application. Accordingly, to improve the user experience the virtual reality application can determine that a frame rate output by the virtual reality application is below a threshold and after the determination, utilize reprojection techniques to reduce the computational load of rendering frames by the portable device and to give the appearance of smoothly rendered frames at a frame rate around the threshold.

Reprojection in virtual reality is a technique used to enhance the visual quality and reduce motion artifacts in VR experiences. It involves recalculating or reprojecting the rendered frames to better align with the user's viewpoint, particularly when the VR system struggles to maintain a consistently high frame rate. When VR applications fail to render new frames at the required rate to match the user's head movements, reprojection comes into play. Instead of displaying outdated frames, the system utilizes reprojection to predict the user's head position and re-renders the frames to align with the updated viewpoint which compensates for a lagging frame rate. This process effectively reduces judder and motion blur, resulting in a smoother, more immersive experience for the user. Reprojection is used to mitigate performance limitations and hardware constraints in VR systems, ensuring that users can enjoy visually consistent and responsive experiences even when the system is unable to consistently achieve the required frame rate. By dynamically adjusting rendered frames to match the user's actual head movements, reprojection helps to maintain visual fidelity and reduce motion sickness, contributing to a more enjoyable and comfortable VR experience.

Other techniques can also be used to provide an even better virtual reality experience for users. These can include Bluetooth-based controllers that track via a colored LED constellation.

It is also possible to combine aspects of the present technology with a slightly more sophisticated viewer than the shell and lens system described herein. In such a system, a low-cost shell could include a camera and potentially other sensors that can integrate with the mobile phone, which would still provide the computing power to run the virtual reality application and render the virtual reality frames on its own display.

Figure 2:
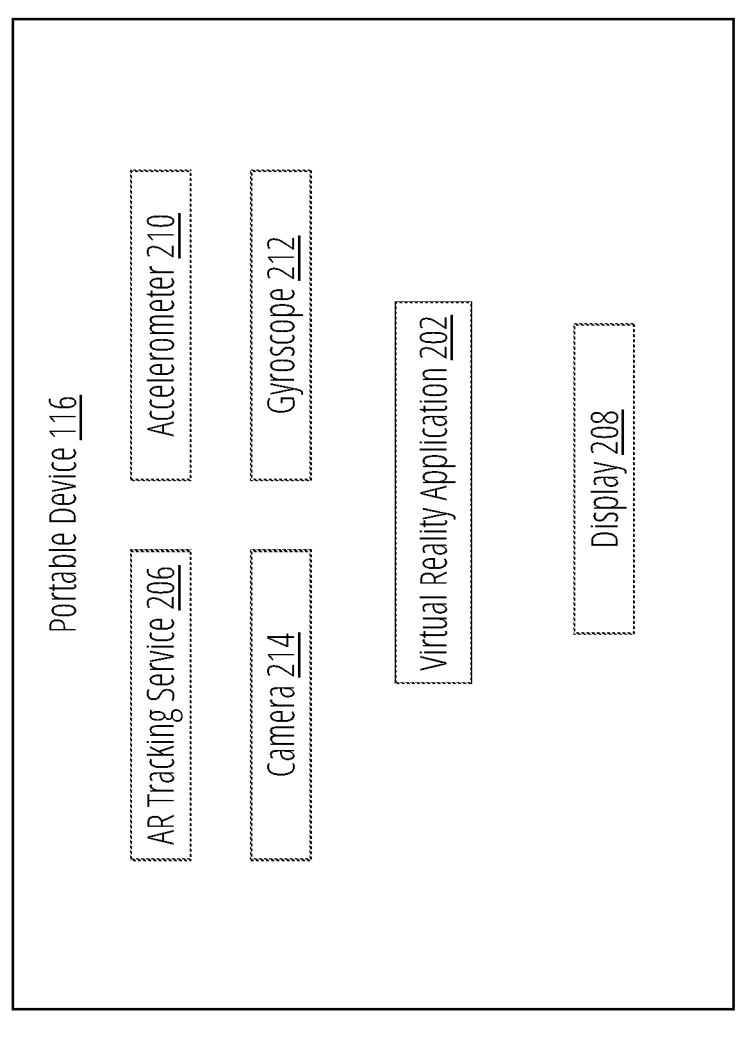
FIG. 2 illustrates an example client device system and components in accordance with some aspects of the present technology.

FIG. 2 illustrates an example portable device and components in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

As illustrated the portable device 116 includes components such as virtual reality application 202, AR tracking service 206, display 208, accelerometer 210, gyroscope 212, and camera 214. While FIG. 2 does not illustrate other essential components of a portable device 116 such as chipsets and memory, though they are part of the portable device 116.

The virtual reality application 202 is any application that is capable of rendering a right eye projection 102 and left eye projection 104 for the purposes of providing a virtual reality experience.

The display 208 can be any display device of a portable device 116 that can display the right eye projection 102 and left eye projection 104.

The accelerometer 210, gyroscope 212, and camera 214 are common sensors or devices found in portable device 116 and are used in locating the portable device 116 in space for the purposes of supporting augmented reality, virtual reality, and mixed reality scenes.

The accelerometer 210 the accelerometer measures the acceleration forces acting on the device, including changes in linear motion and orientation. It detects the direction and magnitude of these accelerations in three axes: X, Y, and Z. This information helps track the portable device's movement and gravitational forces.

The gyroscope 212 measures the angular velocity of the portable device, capturing its rotational movements around the three axes. By continuously detecting orientation changes, the gyroscope provides precise data for tracking the portable device's rotational movements in real-time.

The camera(s) 214 on the portable device 116 serve as visual sensors, capturing images and video of the physical surroundings. These visual inputs are essential for determining the portable device's relative position and orientation in relation to the environment. Computer vision techniques, such as feature detection and tracking, are often employed to extract relevant information from the camera feeds.

The AR tracking service 206 is a software service that utilizes and fuses outputs of various sensors to provide accurate and near-real-time tracking (but with too much latency for virtual reality applications) of the device's position and orientation in the physical world. Examples of AR tracking service 206 include ARCore (Android) and ARKit (iOS). The AR tracking service 206 combines the outputs of sensors, along with sophisticated algorithms and techniques, to estimate and update the device's position, orientation, and motion. The sensor outputs play a crucial role in enabling augmented reality applications to overlay virtual objects seamlessly onto the real-world environment. In addition to the accelerometer 210, gyroscope 212, and camera 214, the AR tracking service 206 can also take advantage of other sensors, if they are available, such as a magnetometer, and a time-of-flight (ToF) sensor, LiDAR, and even speakers and a microphone for sounding-based measurements among other sensors.

FIG. 3 illustrates an example method for ordering data received from sensors and augmented reality (AR) frames to provide a virtual reality experience in accordance with some aspects of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the routine may perform functions at substantially the same time or in a specific sequence.

According to some examples, the method includes repeatedly receiving instances of sensor inputs making up a collection of sensor inputs at block 302. For example, the virtual reality application 202 illustrated in FIG. 2 may repeatedly receive instances of sensor inputs making up a collection of sensor inputs. The collection of sensor inputs includes at least a low latency sensor input having a first timestamp and a higher-latency sensor input having a second timestamp. The low latency sensor input is typified by having a timestamp of less than 30 milliseconds (and typically less than 2 milliseconds) after the data was captured. The higher latency sensor input is typified by having a timestamp of 30 milliseconds or greater (in some examples 150-200 milliseconds) after the data was captured. An example of the low latency sensor input is accelerometer measurements and/or gyroscope measurements. An example of the higher latency sensor input is AR frames output by an AR tracking service.

The AR frames are camera frames that have been processed to be augmented with sensor, tracking, and depth information that make the AR frames suitable for use with AR applications. The present technology, in particular, makes use of positional and rotational tracking out of the AR frames. The virtual reality application utilizes data, especially from the accelerometer, gyroscope, and AR frames, to measure rotation in quaternions, rotational velocity, position, velocity, and acceleration in device coordinates.

The virtual reality application is executed on a device that is not purpose-built for virtual reality applications. For example, the virtual reality application is executed on a portable device having augmented reality services, such as a smartphone. The virtual reality application is configured to divide a display of the portable device into two different fields of view.

According to some examples, the method includes repeatedly determining state parameters from the collection of sensor inputs based on the current ordering of the collection of sensor inputs at block 304. For example, the virtual reality application 202 illustrated in FIG. 2 may repeatedly determine state parameters from the collection of sensor inputs based on the collection of sensor inputs in the current order. However, as addressed below, the current order may not be the correct order.

According to some examples, the method includes repeatedly ordering the collection of sensor inputs according to when the data was captured rather than the order in which the collection of sensor inputs were received to result in an ordered collection of sensor inputs at block 306. For example, the virtual reality application 202 illustrated in FIG. 2 may repeatedly order the collection of sensor inputs according to when the data was captured rather than the order in which the collection of sensor inputs were received. As illustrated in FIG. 4, timeline 410 and timeline 420 shows an initial ordering of the collection of sensor inputs, while timeline 430 shows the collection of sensor inputs having been ordered according to when the data was captured rather than when they have been received. The repeatedly ordering of the collection of sensor inputs results second ordering of the collection of sensor inputs where the higher latency sensor input is ordered before an instance of sensor input that was received before it, wherein state parameters had already been determined using the sensor input from the first ordering.

The repeated ordering the collection of sensor inputs according to when the data was captured can be performed by ordering the collection of sensor inputs using their timestamps that reflect when the data was captured rather than the order in which the sensor inputs are received to result in an ordered collection of sensor inputs at block 306.

Now that the collection of sensor inputs is in the correct order (a second ordering) reflecting when the data was captured rather than the order in which the collection of sensor inputs was received the states can be properly computed. According to some examples, the method returns to block 304 to repeatedly determine state parameters from the collection of sensor inputs based on the second ordering of the collection of sensor inputs at block 304. For example, the virtual reality application 202 illustrated in FIG. 2 may repeatedly determine state parameters from the collection of sensor inputs based on the collection of sensor inputs in the correct order. The determination of state parameters from the collection of sensor inputs can be performed using an unscented Kalman filtering technique.

Kalman filters are a method of combining multiple noisy data sources into one high-quality data source, by taking into account an expected Gaussian distribution of input data. Unscented Kalman Filtering is a variant of the traditional Kalman filter, which is a widely-used recursive algorithm for state estimation in dynamic systems. The primary difference is that Unscented Kalman Filtering handles non-linear systems more effectively by employing an unscented transformation. In simple terms, the Kalman filter is designed to accurately estimate the state of a system based on noisy measurements. It works by combining predictions from a dynamic system model (known as the process model) and real-time measurements to iteratively update the state estimate. However, the traditional Kalman filter assumes the system is linear, which may not always be the case in practical scenarios. This is where the Unscented Kalman Filter comes into play. Unscented Kalman Filtering approximates the non-linear dynamics by a set of representative points, called sigma points, instead of linearizing the equations. To implement Unscented Kalman Filtering, the algorithm follows these steps: 1. Initialization: Start with an initial estimate of the system state and covariance. 2. Sigma Points Generation: Calculate a set of sigma points around the current state estimate using a chosen spread. 3. Predict Sigma Points: Transform the sigma points through the process model to obtain predicted sigma points. 4. Predict Mean and Covariance: Estimate the predicted state mean and covariance using the predicted sigma points. 5. Measurement Update: Apply the measurement model to update the predicted state estimate using real-time measurements and the predicted sigma points. 6. Estimate State: Obtain the filtered estimate of the system state after updating. 7. Repeat: Iterate the process by going back to step 3 using the new state estimate as the starting point. By incorporating the unscented transformation, Unscented Kalman Filtering enables accurate estimation in non-linear systems without the need for laborious mathematical derivations to linearize the model. The approach provides a more efficient and reliable solution in scenarios where the traditional Kalman filter falls short. It's important to note that while Unscented Kalman Filtering is a powerful tool for state estimation, its application and effectiveness depend on the specific characteristics and requirements of the system being modeled.

While Unscented Kalman filtering is a known technique, the present technology presents an unexpected solution to the problem because using Kalman filters differently than they are typically used. As described above Kalman filters and Unscented Kalman filtering are typically used to get a current state. These techniques are often utilized because they take up almost no memory. In normal usage, to use a Kalman filter, you keep track of the state and a noise matrix—all for the current state. All prior measurements are no longer needed and can be discarded. Whereas, in the present technology, it defeats a main advantage of a Kalman filter by requiring significantly more memory (approximately 150 times more memory usage) and an even greater proportion of increased CPU utilization. The greater memory and CPU utilization is due in part to the that we need to keep track of prior sensor measurements 404 and prior virtual reality states 406 and recompute those virtual reality states 406 as addressed with respect to block 304.

Repeatedly determining the state parameters results in determining new state parameters associated with the collection of sensor inputs starting with the reordered higher latency sensor input in the second ordering of the collection of sensor inputs. As addressed with respect to timeline 430 in FIG. 4, virtual reality states 406 are continuously calculated based on the existing order (the first ordering) of the collection of sensor inputs, but once the collection of sensor inputs is in the correct order (the second ordering) some states need to be updated. This is because the virtual reality states are calculated from previous and current sensor measurements. That is, the state of a prior sensor measurement is relevant in calculating the state after the current sensor measurement. Since states that were calculated based on the first ordering of the collection of sensor inputs would include some states calculated based on an incorrect ordering those states need to be recalculated to account for the correct ordering of the collection of sensor inputs.

The purpose of correctly ordering the collection of sensor inputs is to be able to more accurately calculate states, which are needed to project the position of the user's head in a future time and make renderings based on this. This technique is known as pre-projection and can result in a significantly improved virtual reality experience.

According to some examples, the method includes pre-projecting a virtual reality scene based on an estimation of a location of a user's head at block 308. For example, the virtual reality application 202 illustrated in FIG. 2 may preproject a virtual reality scene based on an estimation of a location of a user's head. The estimation of the location of the user's head is determined from the most current ordering of the collection of sensor inputs and the state parameters.

Preprojection in virtual reality refers to the technique of pre-rendering or precalculating certain graphical elements or frames based on the ordered collection of sensor inputs and the state parameters before they are displayed to the user. This approach is often used to improve the performance and visual quality of the virtual reality experience. By preprojecting certain elements, such as static backgrounds or lighting effects, the virtual reality system can reduce the computational workload during real-time rendering, resulting in smoother and more responsive visuals. Preprojection also allows for optimizations such as pre-warping the image to correct for lens distortions in VR headsets, which can enhance the overall visual fidelity and immersion for the user. Additionally, preprojection can help minimize latency and maintain consistent frame rates, crucial factors for delivering a comfortable and engaging VR experience. Overall, preprojection in virtual reality is used to optimize performance, enhance visual quality, and ensure a seamless and immersive user experience.

FIG. 4 illustrates examples of timelines of a collection of sensor inputs in accordance with some aspects of the present technology.

FIG. 4 illustrates timeline 410, timeline 420, and timeline 430. Timeline 410 illustrates the timeline before a new AR frame 422 is received as part of the collection of sensor inputs. Timeline 420 illustrates receiving the AR frame 422, while timeline 430 illustrates AR frame 422 after it has been appropriately ordered to be in approximately the position in the timeline 430 at which the AR frame 422 was captured.

The timelines show a time axis 402 showing time progressing from t=1 past t=7 to a current time, t=now. Timeline 410 also shows sensor measurements 404 arranged along the timeline 410 showing times that the sensor measurements 404 were received. The sensor measurements are coded as G for gyroscope, AR for AR frame, and A for accelerometer. Timeline 410 also shows virtual reality states 406, which are calculated using the unscented Kalman filtering based on preceding and current sensor measurements 404.

Timeline 420 illustrates the higher latency sensor input without a correction. For example, an AR frame 422 is received after t=7 but with a timestamp for a prior time, t=5.5. Unfortunately, the AR frame 422 was initially captured at t=5.5, but because of latency due to processing of the sensor inputs that are used in generating the AR frame 422, the AR frame 422 arrives out of order. More specifically, the present technology can determine that AR frame 422 was captured at t=5.5, but the gyroscope measurement at t=6 and the accelerometer measurement at t=7 have already been received since those measurements are low latency sensor inputs. Usually, the accelerometer and gyroscope data don't need to be rearranged, but sometimes they do.

Timeline 430 illustrates the sensor measurements 404 now being correctly ordered (effectively time-shifting the AR frame backward in time). In addition, timeline 430 also illustrates state revisions 432. State revisions are necessary because the virtual reality states 406 are calculated from previous and current sensor measurements 404. Some virtual reality states 406 were therefore calculated based on the order of sensor measurements 404 shown in timeline 410. But once the order of sensor measurements 404 has been corrected as shown in timeline 430, all virtual reality states 406, starting with the AR frame 422, need to be calculated again, resulting in state revisions 432.

FIG. 5 illustrates an example routine for tuning the present technology with more accurate estimations of measurement noise and process noise in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The determination of the virtual reality states and the use of the virtual reality states to pre-project a virtual reality scene can be somewhat inaccurate due to the existence of measurement noise and process noise. The measurement noise refers to how inaccurate the sensors might be. The process noise refers to how inaccurate the pre-projection might be.

It is generally difficult to figure out whether the noise is process noise or measurement noise, but for this particular use case, because we have a projection (from the pre-projection process) of where the user's head is going to be at a specific time, and then later on, the virtual reality application 202 receives an AR core frame coming in that says where we the user's head actually the virtual reality application 202 can use the delta between the AR frame and the pre-projection of the head position as an indication of how wrong the prediction is.

According to some examples, the method includes pre-projecting a virtual reality scene based on an estimation of a location of a user's head at block 502. For example, the virtual reality application 202 illustrated in FIG. 2 may pre-project a virtual reality scene based on an estimation of a location of a user's head. The estimation of the location of the user's head is determined from the ordered collection of sensor inputs.

According to some examples, the method includes comparing positional and rotational tracking data in the AR frame at the time data was captured with the pre-projected virtual reality scene to determine a delta between the estimated location of the user's head and the actual location of the user's head at block 504. For example, the virtual reality application 202 illustrated in FIG. 2 may compare positional and rotational tracking data in the AR frame at the time data was captured with the pre-projected virtual reality scene to determine a delta between the estimated location of the user's head and the actual location of the user's head.

According to some examples, the method includes executing an algorithm configured to attribute a cause of the delta between the estimated location of the user's head and the actual location of the user's head to measurement noise and process noise for the measured variables at block 506. For example, the virtual reality application 202 illustrated in FIG. 2 may execute an algorithm configured to attribute a cause of the delta between the estimated location of the user's head and the actual location of the user's head to measurement noise and process noise for the measured variables. For example, the algorithm can be a genetic algorithm or other machine learning algorithm.

In the example of the genetic algorithm, tunable parameters are provided to the computer to systematically adjust the parameters to see if the prediction can be improved until a conclusion is reached regarding the error bounds for the measurement noise. These error bounds can be used to tune the values of uncertainties for rotation, velocity, acceleration, etc.

According to some examples, the method includes tuning error bounds to account for the measurement noise for the measured variables to result in more accurate pre-projection at block 508.

Figure 6:
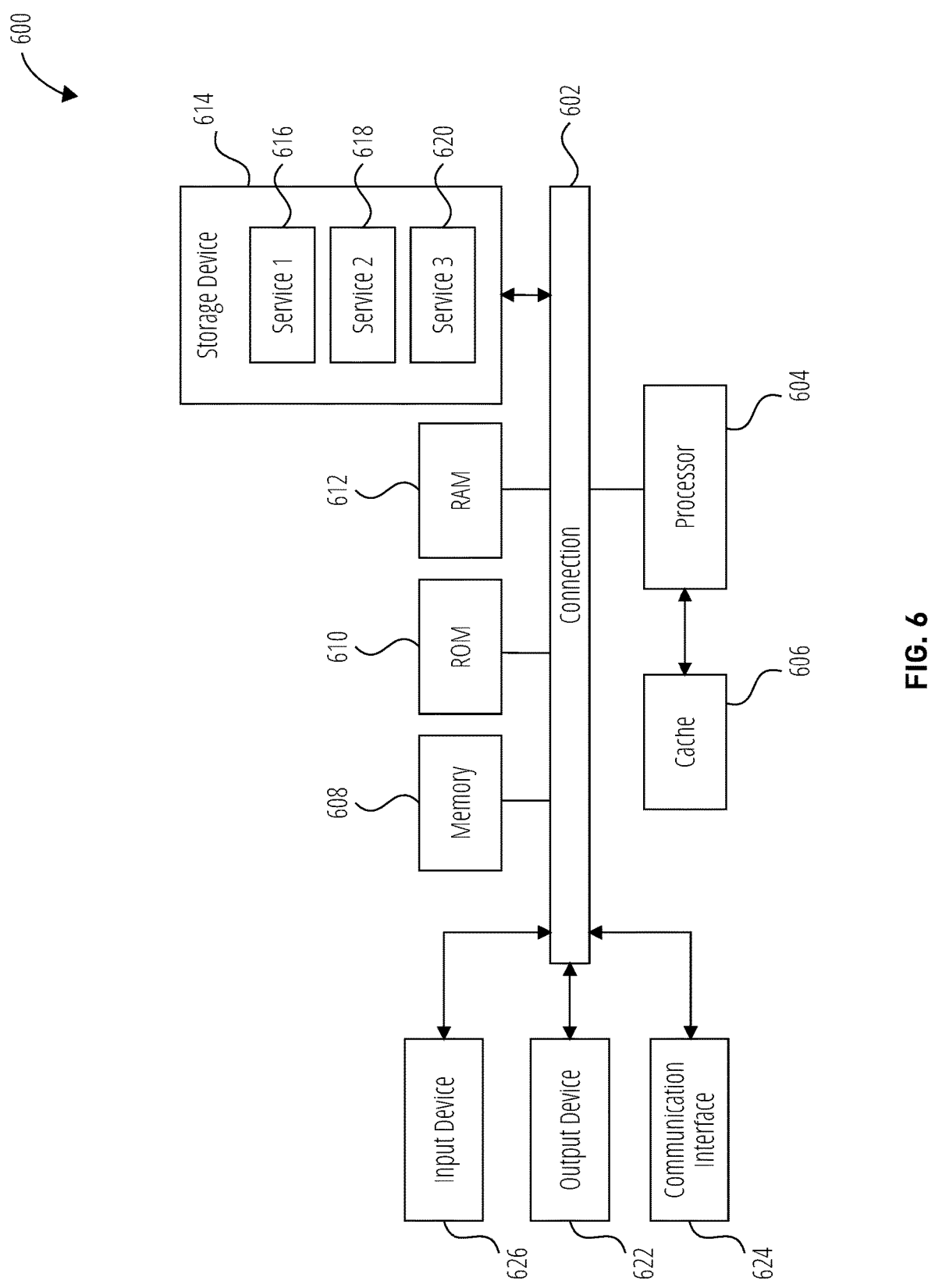
FIG. 6 shows an example of a system for implementing certain aspects of the present technology.

FIG. 6 shows an example of computing system 600, which can be for example any computing device making up the portable device 116, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

ASPECTS

The present technology includes computer-readable storage mediums for storing instructions, and systems for executing any one of the methods embodied in the instructions addressed in the aspects of the present technology presented below:

Aspect 1: A method for ordering inputs when at least one input is subject to more significant latency than other inputs, the method includes repeatedly receiving, by a virtual reality application, instances of sensor inputs making up a collection of sensor inputs including at least a low latency sensor input having first timestamp and a higher latency sensor input having a second timestamp, wherein the low latency sensor input is typified by having a timestamp of less than 30 milliseconds (and typically less than 2 milliseconds) after the data was captured and the higher latency sensor input is typified by having a timestamp of 30 milliseconds or greater (in some examples 150-200 milliseconds) after the data was captured, wherein an example of the low latency sensor input is accelerometer measurements and/or gyroscope measurements, where an example of the higher latency sensor input is AR frames output by an AR tracking service, where the AR frames are camera frames that have been processed to be augmented with sensor, tracking, and depth information that make the AR frames suitable for use with AR applications, and with respect to the present technology especially positional and rotational tracking out of the camera, the virtual reality application executing on a device that is not purpose-built for virtual reality applications, for example the virtual reality application is executing on a portable device having augmented reality services, we are measuring rotation in quaternions, rotational velocity, position, velocity and acceleration in device coordinates, the virtual reality application is configured to divide a display of the portable device into two different fields of view, repeatedly ordering, by the service, the collection of sensor inputs according to when the data was captured rather than the first timestamp or second timestamp to result in an ordered collection of sensor inputs, where the service utilizes unscented Kalman filtering to perform the ordering, and pre-projecting a virtual reality scene based on an estimation of a location of a user's head, where the estimation of the location of the user's head is determined from the ordered collection of sensor inputs.

Aspect 2: The method of Aspect 1 may also include repeatedly determining state parameters from the collection of sensor inputs based on a first ordering of the collection of sensor inputs, after receiving the higher latency sensor input, the repeatedly ordering of the collection of sensor inputs results in a second ordering of the collection of sensor inputs where the higher latency sensor input is ordered before an instance of sensor input having an earlier timestamp, where state parameters had already been determined using the sensor input with the earlier timestamp in the first ordering, where the repeatedly determining the state parameters results in determining new state parameters associated with the collection of sensor inputs starting with the higher latency sensor input in the second ordering of the collection of sensor inputs.

Aspect 3: The method of any one of Aspects 1-2 may also include where the higher latency sensor input is an AR frame, the method further includes comparing positional and rotational tracking data in the AR frame at the time data was captured with the pre-projected virtual reality scene to determine a delta between the estimated location of the user's head and the actual location of the user's head, executing an algorithm configured to attribute a cause of the delta between the estimated location of the user's head and the actual location of the user's head to measurement noise and process noise for the measured variables, wherein the algorithm is a machine learning algorithm, where the algorithm is a genetic algorithm.

Aspect 4: The method of any one of Aspects 1-3 may also include where the portable device is inserted into a viewer, such as a pair of googles configured to project two different fields of view displayed by the display of the portable device into a left and right eye, respectively, of the user.

Aspect 5: The method of any one of Aspects 1-4 may also include executing, by the virtual reality application, a hand-tracking process that is configured to receive camera images and to track positions and gestures of the user's hands and translate those positions and gestures into inputs into the virtual relation application.

Aspect 6: The method of any one of Aspects 1-5 may also include determining that a frame rate output by the virtual reality application is below a threshold, after the determination, utilizing reprojection techniques to reduce a computational load of rendering frames by the portable device and to give the appearance of smoothly rendered frames at a frame rate around the threshold. Other technical features may be readily apparent to one skilled in the art from the following figures, descriptions, and claims.

What is claimed is:

1. A method for ordering inputs when at least one input is subject to more significant latency than other inputs, the method comprising:
repeatedly receiving, by a virtual reality application, instances of sensor inputs making up a collection of sensor inputs including at least a low latency sensor input having a first timestamp and a higher latency sensor input having a second timestamp, wherein the higher latency sensor input is received out of order relative the low latency sensor inputs;
repeatedly ordering, by the virtual reality application, the collection of sensor inputs according to the first timestamp and the second timestamp rather than the order in which the collection of sensor inputs were received to result in an ordered collection of sensor inputs; and
pre-projecting, by the virtual reality application, a virtual reality scene based on an estimation of a location of a user's head, wherein the estimation of the location of the user's head is determined from the ordered collection of sensor inputs.

2. The method of claim 1, further comprising:
repeatedly determining state parameters from the collection of sensor inputs based on a first ordering of the collection of sensor inputs;
after receiving the higher latency sensor input, the repeatedly ordering the collection of sensor inputs results second ordering of the collection of sensor inputs where the higher latency sensor input is ordered before an instance of low latency sensor input received before the higher latency sensor input even though the higher latency sensor input has an earlier timestamp than the low latency sensor input, wherein the state parameters had already been determined using the sensor input in the first ordering;
wherein the repeatedly determining the state parameters results in determining new state parameters associated with the collection of sensor inputs starting with the higher latency sensor input in the second ordering of the collection of sensor inputs.

3. The method of claim 1, wherein the higher latency sensor input is an AR frame, the method further comprising:
comparing positional and rotational tracking data in the AR frame at with the pre-projected virtual reality scene to determine a delta between an estimated location of the user's head and an actual location of the user's head;
executing an algorithm configured to attribute a cause of the delta between the estimated location of the user's head and the actual location of the user's head to measurement noise and process noise for the sensor inputs; and
tuning error bounds to account for the measurement noise for the sensor inputs to result in more accurate pre-projection.

4. The method of claim 1, wherein the virtual reality application is executing on a portable device and the portable device is inserted into a viewer, such as a pair of googles configured to project two different fields of view displayed by the display of the portable device into a left and right eye, respectively, of the user.

5. The method of claim 1, further comprising:
executing, by the virtual reality application, a hand-tracking process that is configured to receive camera images and to track positions and gestures of the user's hands and translate the positions and the gestures into inputs of the virtual reality application.

6. The method of claim 1, further comprising:

determining that a frame rate output by the virtual reality application is below a threshold;

after the determination, utilizing reprojection techniques to reduce a computational load of rendering frames by a portable device executing the virtual reality application and to give an appearance of smoothly rendered frames at a frame rate around the threshold.

7. The method of claim 2, wherein the virtual reality application utilizes unscented Kalman filtering to determine the new state parameters associated with the collection of sensor inputs starting with the higher latency sensor input in the second ordering of the collection of sensor inputs.

8. The method of claim 1, wherein the low latency sensor input is accelerometer measurements or gyroscope measurements.

9. The method of claim 1, wherein the higher latency sensor input is AR frames output by an AR tracking service.

10. The method of claim 1, wherein the virtual reality application executing on a device that is not purpose-built for virtual reality applications.

11. A computing system comprising:

at least one processor; and a memory storing instructions that, when executed by the at least one processor, configure the system to:

repeatedly receive, by a virtual reality application, instances of sensor inputs making up a collection of sensor inputs including at least a low latency sensor input having first timestamp and a higher latency sensor input having a second timestamp, wherein the higher latency sensor input is received out of order relative the low latency sensor inputs;

repeatedly order, by the virtual reality application, the collection of sensor inputs according to the first timestamp and second timestamp rather than the order in which the collection of sensor inputs were received to result in an ordered collection of sensor inputs; and pre-projecting, by the virtual reality application, a virtual reality scene based on an estimation of a location of a user's head, wherein the estimation of the location of the user's head is determined from the ordered collection of sensor inputs.

12. The computing system of claim 11, wherein the instructions further configure the system to:

repeatedly determine state parameters from the collection of sensor inputs based on a first ordering of the collection of sensor inputs;

after receiving the higher latency sensor input, the repeatedly ordering of the collection of sensor inputs results second ordering of the collection of sensor inputs where the higher latency sensor input is ordered before an instance of low latency sensor input received before the higher latency sensor input even though the higher latency sensor input has an earlier timestamp than the low latency sensor input, wherein the state parameters had already been determined using the sensor input in the first ordering;

wherein the repeatedly determine the state parameters results in determining new state parameters associated with the collection of sensor inputs starting with the higher latency sensor input in the second ordering of the collection of sensor inputs.

13. The computing system of claim 11, wherein the higher latency sensor input is an AR frame, wherein the instructions further configure the system to:

compare positional and rotational tracking data in the AR with the pre-projected virtual reality scene to determine a delta between an estimated location of the user's head and an actual location of the user's head;

execute an algorithm configured to attribute a cause of the delta between the estimated location of the user's head and the actual location of the user's head to measurement noise and process noise for the sensor inputs; and tune error bounds to account for the measurement noise for the sensor inputs to result in more accurate pre-projection.

14. The computing system of claim 11, wherein the virtual reality application is executing on a portable device and the portable device is inserted into a viewer, such as a pair of googles configured to project two different fields of view displayed by the display of the portable device into a left and right eye, respectively, of the user.

15. The computing system of claim 11, wherein the instructions further configure the system to:

determine that a frame rate output by the virtual reality application is below a threshold;

after the determination, utilize reprojection techniques to reduce a computational load of rendering frames by a portable device executing the virtual reality application and to give an appearance of smoothly rendered frames at a frame rate around the threshold.

16. A non-transitory computer-readable storage medium, the computer-readable storage medium including instructions that when executed by at least one processor, cause the at least one processor to:

repeatedly receive, by a virtual reality application, instances of sensor inputs making up a collection of sensor inputs including at least a low latency sensor input having a first timestamp and a higher latency sensor input having a second timestamp, wherein the higher latency sensor input is received out of order relative the low latency sensor inputs;

repeatedly order, by the virtual reality application, the collection of sensor inputs according to the first timestamp and the second timestamp rather than the order in which the collection of sensor inputs were received to result in an ordered collection of sensor inputs; and pre-projecting, by the virtual reality application, a virtual reality scene based on an estimation of a location of a user's head, wherein the estimation of the location of the user's head is determined from the ordered collection of sensor inputs.

17. The computer-readable storage medium of claim 16, wherein the instructions further configure the at least one processor to:

repeatedly determine state parameters from the collection of sensor inputs based on a first ordering of the collection of sensor inputs;

after receiving the higher latency sensor input, the repeatedly ordering the collection of sensor inputs results second ordering of the collection of sensor inputs where the higher latency sensor input is ordered before an instance of low latency sensor input received before the higher latency sensor input even though the higher latency sensor input has an earlier timestamp than the low latency sensor input, wherein the state parameters had already been determined using the sensor input in the first ordering;

wherein the repeatedly determine the state parameters results in determining new state parameters associated with the collection of sensor inputs starting with the higher latency sensor input in the second ordering of the collection of sensor inputs.

18. The computer-readable storage medium of claim 16, wherein the higher latency sensor input is an AR frame, wherein the instructions further configure the at least one processor to:

compare positional and rotational tracking data in the AR frame with the pre-projected virtual reality scene to determine a delta between an estimated location of the user's head and an actual location of the user's head;

execute an algorithm configured to attribute a cause of the delta between the estimated location of the user's head and the actual location of the user's head to measurement noise and process noise for the sensor inputs; and tune error bounds to account for the measurement noise for the sensor inputs to result in more accurate pre-projection.

19. The computer-readable storage medium of claim 16, wherein the virtual reality application is executing on a portable device and the portable device is inserted into a viewer, such as a pair of googles configured to project two different fields of view displayed by the display of the portable device into a left and right eye, respectively, of the user.

20. The computer-readable storage medium of claim 16, wherein the instructions further configure the at least one processor to:

determine that a frame rate output by the virtual reality application is below a threshold;

after the determination, utilize reprojection techniques to reduce a computational load of rendering frames by a portable device executing the virtual reality application and to give an appearance of smoothly rendered frames at a frame rate around the threshold.

* * * * *